US008792439B2

(12) United States Patent
Kahn et al.

(10) Patent No.: US 8,792,439 B2
(45) Date of Patent: Jul. 29, 2014

(54) METHOD AND SYSTEM FOR RATE ADAPTIVE ALLOCATION OF RESOURCES

(75) Inventors: Colin Kahn, Morris Plains, NJ (US); Harish Viswanathan, Morristown, NJ (US); Mark Clougherty, Chatham, NJ (US); Andre Beck, Batavia, IL (US)

(73) Assignee: Alcatel Lucent, Boulogne Billancourt (FR)

( * ) Notice: Subject to any disclaimer, the term of this patent is extended or adjusted under 35 U.S.C. 154(b) by 236 days.

(21) Appl. No.: 13/253,393

(22) Filed: Oct. 5, 2011

(65) Prior Publication Data

US 2013/0089033 A1  Apr. 11, 2013

(51) Int. Cl.
*H04W 72/04* (2009.01)

(52) U.S. Cl.
USPC ............... 370/329; 370/232; 709/231; 726/1

(58) Field of Classification Search
USPC .............. 370/259, 230–238.1, 328–338, 252; 709/231, 203, 219; 726/1
See application file for complete search history.

(56) References Cited

U.S. PATENT DOCUMENTS

| 2005/0232148 | A1* | 10/2005 | Curcio et al. ................. 370/230 |
| 2009/0046642 | A1* | 2/2009 | Damnjanovic ................ 370/329 |
| 2010/0043053 | A1* | 2/2010 | Wei et al. ............................ 726/1 |
| 2010/0128722 | A1* | 5/2010 | Madour et al. ................ 370/352 |
| 2010/0135229 | A1* | 6/2010 | Lohr et al. ..................... 370/329 |
| 2010/0246533 | A1* | 9/2010 | Lundin et al. ................. 370/332 |
| 2011/0141890 | A1* | 6/2011 | Giaretta et al. ............... 370/232 |
| 2011/0179185 | A1* | 7/2011 | Wang et al. .................... 709/231 |
| 2012/0250509 | A1* | 10/2012 | Leung et al. .................. 370/235 |
| 2013/0215793 | A1* | 8/2013 | Cutler et al. ................... 370/259 |

FOREIGN PATENT DOCUMENTS

| EP | 2416537 A1 | 2/2012 |
| WO | WO-2010049002 A1 | 5/2010 |
| WO | WO-2010111953 A1 | 10/2010 |
| WO | WO-2010148033 A2 | 12/2010 |

OTHER PUBLICATIONS

Zaki et al , Multi-qos aware fair scheduling for LTE, May 2011.*
Alasti et al ,Quality of service in WiMAX and LTE Networks, May 2010.*
3GPP TS 23.203, "3rd Generation Partnership Project; Technical Specification Group Services and System Aspects; Policy and charging control architecture (Release 8)", V8.9.0, Mar. 2010.

(Continued)

*Primary Examiner* — Michael Thier
*Assistant Examiner* — Vincelas Louis
(74) *Attorney, Agent, or Firm* — Harness, Dickey & Pierce

(57) ABSTRACT

The method includes retrieving subscriber and device information based on an application identifier and a GBR request indication, sending a message to a network entity, the message including a Quality of Service (QoS) Class Identifier (QCI), the QCI indicating an AGBR bearer is to be used for delivering content to a mobile unit, generating an AGBR bearer based on the QCI and a GBR setting and associating the content with the AGBR bearer. The method includes sending a message and the content to a network entity, the message including the QCI, scheduling the mobile unit on the AGBR bearer based on the QCI and communicating the content to the mobile unit based on the schedule.

27 Claims, 5 Drawing Sheets

(56) References Cited

OTHER PUBLICATIONS

"3rd Generation Partnership Project; Technical Specification Group Services and System Aspects; Policy and charging control architecture (Release 11)", 3GPP Standard; 3GPP TS 23.203, 3rd Generation Partnership Project (3GPP), Mobile Competence Centre; 650, Route Des Lucioles; F-06921 Sophia-Antipolis Cedex; France, vol. SA WG2, No. V11.3.0, Sep. 21, 2011, pp. 1-167, XP050553787.
International Search Report dated Jan. 10, 2013 for related International Application No. PCT/US2012/057462.
International Preliminary Report dated Apr. 17, 2014.

* cited by examiner

METHOD AND SYSTEM FOR RATE ADAPTIVE ALLOCATION OF RESOURCES

BACKGROUND OF THE INVENTION

1. Field

Embodiments relate to rate adaptive allocation of resources for delivering content over a wireless link.

2. Related Art

Stable transmission channels are required for delivery of many real-time services over wireless packet networks. These channels typically have requirements that stipulate delay, packet loss and throughput requirements. Known standards bodies (e.g., 3GPP and 3GPP2) have recognized this and provide in their respective standards mechanisms for establishing and maintaining Guaranteed Bit Rate (GBR) bearers. The logic applied to these bearers is that an optimum GBR value can be ascertained a-priori, and then used to provide a real-time service at a known quality level.

GBR has almost never been deployed by wireless service providers, largely because GBR bearers can require significant network resources when subscribers are in poor RF conditions. In addition, while the resources needed to maintain a GBR bearer may be acceptable when the network is lightly loaded, allocating significant network resources becomes increasingly less acceptable as the network congestion level increases.

Meanwhile in this environment, adaptive techniques for delivering content to and receiving content from mobile devices are becoming the norm in wireless communications. Examples include transmission of video via HTTP adaptive streaming (HAS), and voice communication via adaptive codecs such as the AMR codec used in 3GPP technologies (GSM, UMTS/HSPA, LTE). What all these techniques have in common is the ability to adapt the rate at which content is delivered to the bandwidth available on the delivery channel. The techniques provide a local optimization, with each client/server pair independently sensing the available bandwidth and adapting accordingly. However even with this ability to adapt, the quality of service delivery in wireless environments is compromised without some degree of channel stability In adaptive streaming techniques a server provides clients with a table of URLs. Every URL points to a specific time interval of a specific quality of the same content. All intelligence is implemented in the client, the server can be any HTTP-compliant device serving regular files. Once the client has downloaded the table of URLs, the client selects the appropriate URL to fetch next. The client performs playback of the content. Typically, the client will initiate playback by selecting the smallest content chunk from those available (e.g., the chunk with the lowest available quality). This will give the fastest start-up time. The Client adjusts available quality within, for example, the network bandwidth.

The content (e.g., media file) is created in multiple qualities by, for example the server. The content is also cut into time intervals synchronously across the different qualities. Typically, every individual chunk is individually addressable by the client.

HAS is emerging as a popular approach to streaming video on demand and real-time content. HAS is adaptive in the sense that the quality of the video can be adjusted based on the bandwidth or data rate available between the server and the client. However, each client individually adapts its video quality independent of other video users sharing the same resources.

Currently there is a mismatch between the capabilities of currently used adaptive delivery protocols and standardized mechanisms to establish stable, GBR channels in wireless environments. The below example embodiments address this problem, and provide a mechanism to ensure that the resource consumed to maintain the stable channels adapts to the degree of congestion in the wireless network.

In conventional systems, the wireless network is modeled as a wireline network and issues such as channel fading, user mobility, throughput discontinuities at handoff, and Limited, shared resources are ignored. Content is delivered via adaptive techniques using best effort, bearers with each client server pair independently sensing the available bandwidth and acting accordingly. This is the typical approach today with adaptive algorithms. This approach is inadequate because variation of content delivery rate due to these issues degrades the quality of experience of the subscriber as is determined for example via Mean Opinion Scores (MOS). Because each client/server pair acts independently to maximize throughput, this approach provides for sub-optimized quality of experience. For example subscribers at the cell edge receiving such a low bit rate that the QoE is unacceptable, while subscribers near the cell antenna have bit rates that far exceed what is really necessary for a particular application.

In conventional systems, GBR bearers are established where the guaranteed bit rate value is determined a-priori. This negates the advantages of having algorithms such as HAS that can adapt to variations in available throughput. Left unconstrained this technique uses excessive amounts of air-interface resources, to the point where this technique is almost never used by wireless service providers. Further, signaling mechanisms for various aspects of the video stream, such as the device screen size, that may be utilized to optimize the resource allocation to the base station have yet to be determined.

In conventional systems typically deployed today, HAS streaming over mobile wireless is based on a best effort allocation of resources. The base station typically employs a proportional fair scheduler that is unaware of the HAS flow and treats HAS and other flows the same. Additionally a guaranteed bit rate (GBR) can be set and throughput for a particular flow can be guaranteed. A guaranteed bit rate (GBR) set equal to the fixed source codec rate of traditional streaming (RTP/UDP or HTTP/TCP progressive download) is known to improve QoE through steady offered rate as channel and load vary.

SUMMARY OF THE INVENTION

Example embodiments provide a method and system to allocate resources in an eNodeB for adaptive bit rate application protocols such as HAS and AMR.

One embodiment includes a method for serving content. The method includes receiving a first message from a mobile unit, the message including a request for content and an indication to use an adaptive guaranteed bitrate (AGBR) bearer to transmit the content to the mobile unit. A server generates a second message based on the first message, the second message including device information associated with the mobile unit and information associated with the AGBR. The server generates the requested content such that the content is configured to be transmitted over an AGBR bearer. The server sends the requested content to a first network entity and sends the second message to a second network entity.

Another embodiment includes a method for indicating an adaptive guaranteed bitrate (AGBR) bearer. The method includes receiving, by a first network entity, a first message from a second network entity, the first message including an application identifier and a guaranteed bitrate (GBR) request indication. The first network entity retrieves subscriber and device information based on the application identifier and the GBR request indication. The first network entity sends a second message to a third network entity, the second message including a Quality of Service (QoS) Class Identifier (QCI), the QCI indicating an AGBR bearer is to be used for delivering content to a mobile unit.

Still another embodiment includes a method for generating an adaptive guaranteed bitrate (AGBR) bearer. The method includes receiving a first message from a first network entity, the message including a Quality of Service (QoS) Class Identifier (QCI), the QCI indicates to use an AGBR bearer for delivering content to a mobile unit and generating an AGBR bearer based on the QCI and a default guaranteed bitrate (GBR) setting.

Still another embodiment includes a method to communicate with a mobile unit over a wireless interface. The method includes receiving a message including a Quality of Service (QoS) Class Identifier (QCI), the QCI indicating an AGBR bearer is to be used for delivering content to a mobile unit, receiving content configured to be transmitted over an AGBR bearer, scheduling the mobile unit on the AGBR bearer based on the QCI and communicating the content to the mobile unit based on the schedule.

Still another embodiment includes a method for delivering content. The method includes receiving a first message including a request for content from a mobile unit, generating a second message based on the first message, the second message including an application identifier and a guaranteed bitrate (GBR) request indication and generating the requested content such that the content is configured to be transmitted over an adaptive guaranteed bitrate (AGBR). The method includes sending the requested content to a first network entity and sending the second message to a second network entity.

The method includes retrieving subscriber and device information based on the application identifier and the GBR request indication, sending a third message to the first network entity, the third message including a Quality of Service (QoS) Class Identifier (QCI), the QCI indicating an AGBR bearer is to be used for delivering the content to the mobile unit, generating an AGBR bearer based on the QCI and a GBR setting and associating the content with the AGBR bearer. The method includes sending a fourth message and the content to a fourth network entity, the fourth message including the QCI, scheduling the mobile unit on the AGBR bearer based on the QCI and communicating the content to the mobile unit based on the schedule.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
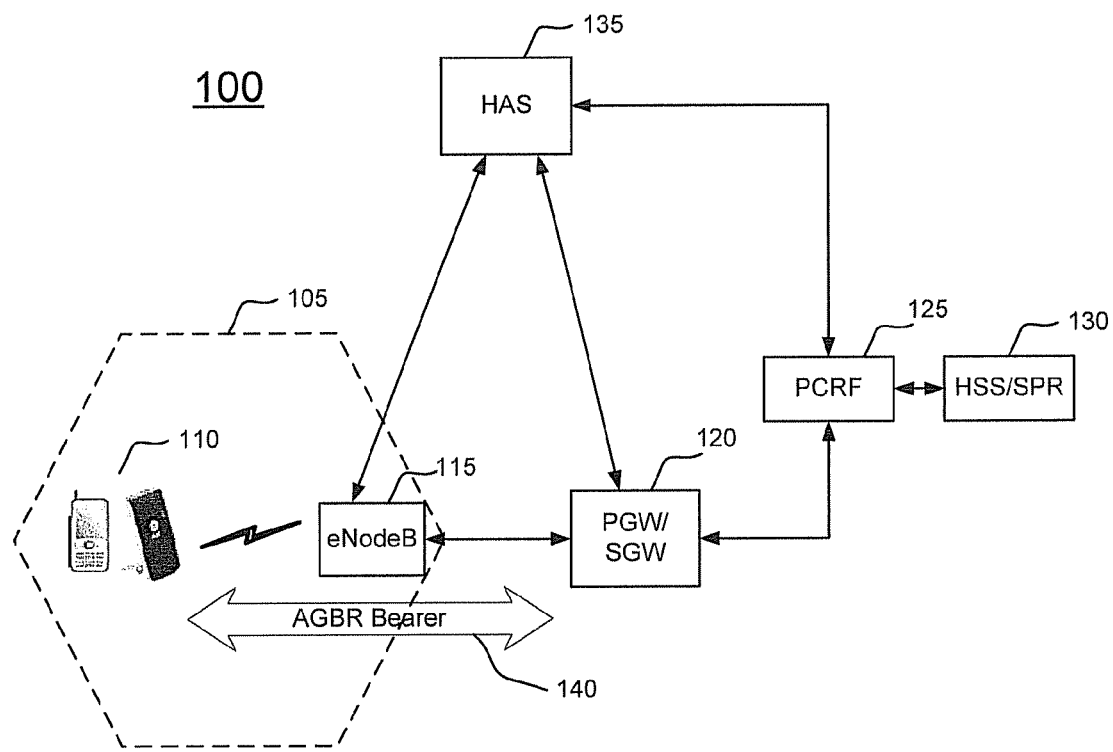
FIG. 1 illustrates a system for rate adaptive allocation of resources in accordance with at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted iri a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

As used herein, the term "mobile unit" may be considered synonymous to, and may hereafter be occasionally referred to, as a client, user equipment, mobile station, mobile user, mobile, subscriber, user, remote station, access terminal, receiver, etc., and may describe a remote user of wireless resources in a wireless communication network.

Similarly, as used herein, the term "evolved Node B" or "eNodeB" may be considered synonymous to, and may hereafter be occasionally referred to, as a Node B, base station, base transceiver station (BTS), etc., and may describe a transceiver in communication with and providing wireless resources to mobiles in a wireless communication network which may span multiple technology generations. As discussed herein, base stations may have all functionally associated with conventional, well-known base stations in addition to the capability to perform the methods discussed herein.

In the following description, illustrative embodiments will be described with reference to acts and symbolic representations of operations (e.g., in the form of flowcharts) that may be implemented as program modules or functional processes include routines, programs, objects, components; data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Example embodiments provide a method and system to allocate resources in an eNodeB for adaptive bit rate application protocols such as HAS and AMR. Example embodiments provide for controlled variation of bandwidth allocation to services rather than leaving the bandwidth allocation fixed (as the case with GBR bearers), or at the mercy of channel capacity fluctuations typical of wireless environments when best effort wireless service is provided.

Example embodiments function, for example, within the context of GBR bearer setup mechanisms standardized by standards bodies (e.g., 3GPP/3GPP2). However the GBR value requested is treated as a target for the type of service, device type and screen type rather than as a fixed value. The actual provided GBR value is controlled dynamically in a systematic manner according to congestion level in an eNodeB. The control allows for optimization and/or improvement of the subscriber Quality of experience (QoE) across a geographic cell taking into account the individual requirements of applications.

Example embodiments are equally applicable to uplink and downlink. For example, during the downlink an eNodeB directly allocates bearer resources. During the uplink the eNodeB signals to a mobile unit the resources the mobile unit is allowed to consume.

FIG. 1 illustrates a system 100 for rate adaptive allocation of resources in accordance with at least one example embodiment. As shown in FIG. 1 system 100 may include geographic cell 105, mobile unit(s) 110, eNodeB 115, Packet Data Network Gateway/Serving Gateway (PGW/SGW) 120, Policy Charging and Rules Function (PCRF) 125, Home Subscription Server/Subscriber Profile Repository (HSS/SPR) 130, HTTP Adaptive Streaming (HAS) Server 135 and Adaptive Guaranteed Bitrate (AGBR) Bearer 140.

Geographic cell 105 may be a geographic area including one or more mobile units 110 communicating with one or more eNodeB's 115 over a wireless communication channel. Geographic cells (e.g., geographic cell 105) are known to those skilled in the art and will not be described further for the sake of brevity.

A mobile unit 110 communicates with one or more eNodeB's 115 over a wireless communication channel using one or more known communication standards. Mobile unit 110 may run one or more applications. The one or more applications may request content be delivered using one or more streaming standards. The one or more streaming standards may include one or more adaptive streaming standards. The requested content may be communicated to the mobile unit 110 from the HAS server 135 via the PGW/SGW 120 and the eNodeB 115. According to at least one example embodiment, the PGW/SGW 120 may communicate with the mobile unit 110 via the eNodeB 115 using the AGBR Bearer 140.

The HAS server 135 (or Content Delivery Network (CDN)) delivers video content. HAS server 135 adapts the rate at which video is delivered according to, for example, a bandwidth between the HAS server 135 and a device client (e.g., mobile unit 110). The HAS server 135 may obtain device specific information such as the screen size from a subscriber and a device data base the HAS server 135 maintains, or in some cases from the client on the device at the time the client requests the content. Other information such as the video complexity or intensity as well as the bit rates associated with the different quality levels of a HAS video may be part of the meta-data of the video that the HAS server 135 stores. This information if available may be conveyed to other network entities/elements.

The HAS server 135 may use an application programming interface (API) to an Open API Platform (OAP). The OAP provides secure exposure of network capabilities to application and protocol translation, for example from a proprietary application to a standards protocol. Alternatively a known 3GPP Rx interface from the HAS server 135 to the PCRF 125 may be used. In either case, the use of specific Application Function Identifiers (AF-Id) on these interfaces is used to indicate a request for an AGBR bearer, and the GBR value specified in the request is a requested target GBR value. If the bit rates of a particular HAS video are known by the HAS server 135, then those values may be passed in addition to or instead of a target GBR value.

A HSS/SPR 130 stores device and subscriber information. The HSS/SPR subscriber information is used to adjust the requested target GBR value according to the subscriber's level of service, device type as indicated by the International Equipment Identity (IMEI) or International Equipment Identity & Software Version (IMEISV) and other stored subscriber specific information. For example, IMEISV scaling allows for different target GBRs for devices with different screen sizes.

A PCRF 125 may map the AF-Id to a special QoS class identifier (QCI) value and applies the scaling of the requested target GBR value according to HSS/SPR information. A core network entity (e.g., PGW/SGW 120) may set-up a GBR in response to an indication from the PCRF 125. The eNodeB 115, in response to setup of a QCI=10 bearer, will use the GBR value as a target and adjust the actual provided bandwidth according to total available resources allocated to the service or available on the cell. If the HAS video bit rates are available, then an AGBR algorithm can adapt the GBR and maximum bitrate (MBR) values so that they closely match the rate of one of the available quality levels.

Figure 2:
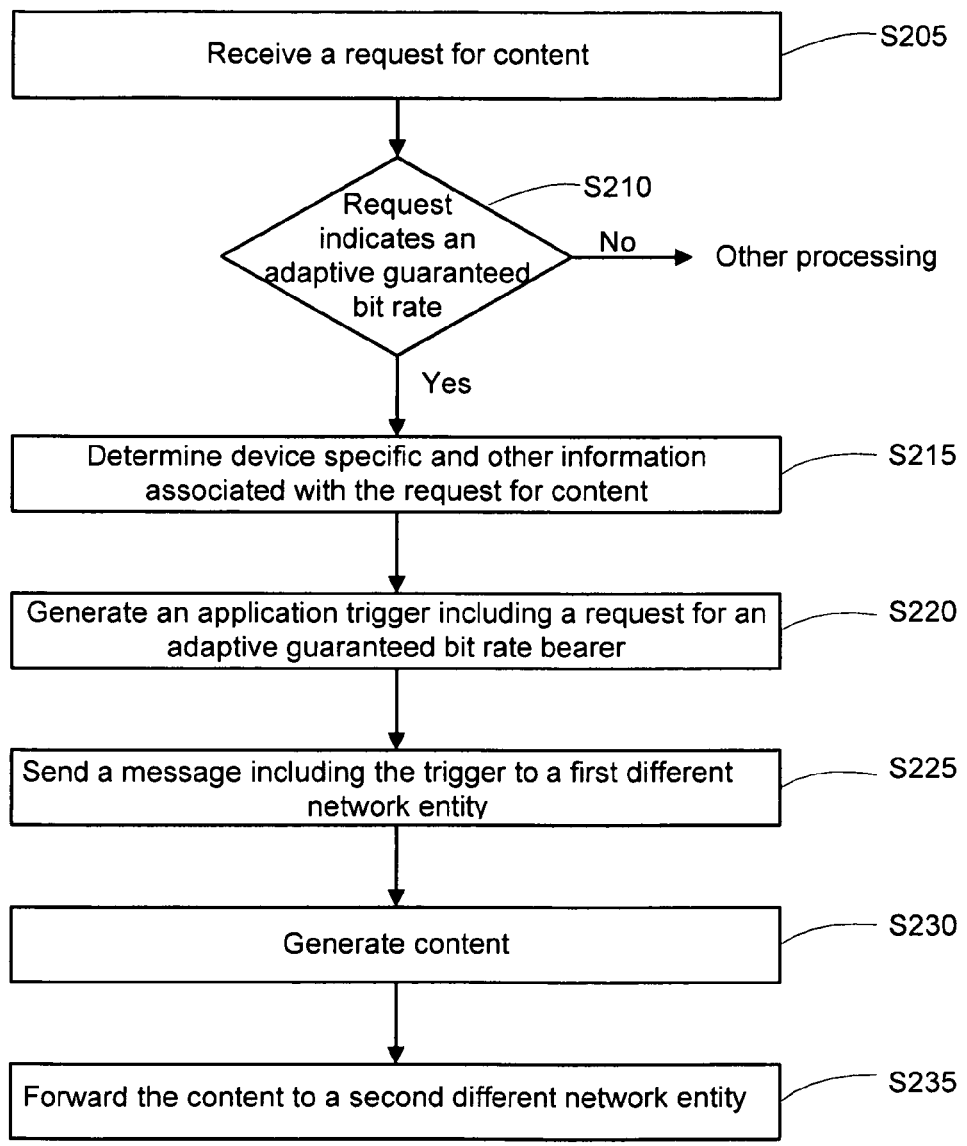
FIG. 2 illustrates a method for rate adaptive allocation of resources in accordance with at least one example embodiment.

FIG. 2 illustrates a method for rate adaptive allocation of resources in accordance with at least one example embodiment. Referring to FIG. 2, in step S205 a network entity may receive a request for content. The content may be, for example, some form of digital media (e.g., a digitized video or digitized audio). Further, the content may be formatted to be communicated using a known adaptive streaming standard (e.g., Dynamic Adaptive Streaming over HTTP as defined by 3GPP or Dynamic Adaptive HTTP Streaming as defined by MPEG).

The network entity may be an application server, a content delivery server or a plurality of servers (e.g., a content delivery network) configured to store and or deliver content. The network entity may be configured to format the content using one or more of the known adaptive streaming standards. The network entity may be a HTTP Adaptive Streaming (HAS) server (e.g., HAS server 135). The request may include information associated with an application and device information associated with the mobile unit.

In step S210 the network entity may determine if the request for content indicates or warrants an adaptive guaranteed bit rate (AGBR). If the request for content does not indicate or warrant an AGBR, some other conventional processing is performed. Otherwise, processing continues to step S215. For example, the request may be in the form of a signaling message. The signaling message may include a value in a field that indicates to use an AGBR to deliver the content. For example, the request may be for a segment of a larger content form (e.g., a segment of video) and previous segments were formatted as AGBR content.

For example, the request may be associated with an application that is configured to communicate using an AGBR. In other words, the mobile unit (e.g., mobile unit 110) may be running an application that has requested the content. The network entity (e.g., HAS server 135) may associate the application with an adaptive streaming standard (e.g., using a look-up table). Determining an AGBR bearer may be used to transmit the content to the mobile unit based on a Quality of Service (QoS) Class Identifier (QCI) associated with the message. The QCI may be the indication to use an AGBR bearer, and a value of the QCI may be undefined in a communications standard.

In step S215 the network entity may determine device specific and other information associated with the request for content. For example, the network entity may determine a type of device (e.g., cell phone, PDA or tablet), a model of the device (e.g., a model number), a display screen size and/or a display screen capability. For example, the network entity may determine an application running on the device, a type of service running on the device, max/min/average data rates over a period of time for the device.

The signaling message may include the device specific and other information. For example, the signaling message may include a field including the device specific and other information. The device may be, for example, mobile unit 110. The device specific and other information may be retrieved from a network device. The signaling message may include at least one of an application ID and a device ID used to determine at least one of the information associated with an application and the device information associated with the mobile unit In step S220 the network entity may generate an application trigger including a request for an adaptive guaranteed bit rate (AGBR) bearer. The application trigger may be a signaling message. For example, the trigger may be a signaling message that is a quality of service (QoS) application programming interface (API) to another network entity. As is known, an API is a mechanism for communicating between devices. An API may be used to request resources. According to example embodiments, the API may be used to request an AGBR for the delivery of the content.

The application trigger may include the device information and/or identification of the application (e.g., an AppID) and/or device (e.g., a DevID) and/or subscription information so that additional information may be looked up. The application trigger may include a manifest file. Manifest files are known to those skilled in the art. The manifest file may include data rate information (e.g., data rates associated with delivery of content to mobile user 110). The application trigger may include an association between the device and the content. (e.g., mobile user 110 may be mapped to the request for content). The application trigger may include an association between a previously established AGBR bearer, an identification of the application (e.g., an AppID) and/or device (e.g., a DevID).

In step S225 the network entity may send the application trigger to a first different network entity. For example, the application trigger may be sent in or as a message to the another network entity. The another network entity may be, for example, a server including a Policy Charging and Rules Function (PCRF), e.g., PCRF 125. The message may include a resource identifier. The resource identifier may be a Universal Resource Locator (URL). The message may include an application identifier and a guaranteed bitrate (GBR) request indication, and the application identifier may trigger a subscriber lookup based on the GBR request, the information associated with the AGBR and the device information. The message may include device dependent bitrate information, and the device dependent bitrate information may be mapped to the information associated with the AGBR.

In step S230 the network entity may generate the content. The content may be configured to be transmitted over an AGBR bearer. For example, the network entity may generate the content using any known HAS standard. As discussed above, the network entity may be a HAS server (e.g., HAS server 135) configured to generate HAS content using one or more known HAS standards. In step S235 the network entity may forward the content to a second different network entity. For example, the content may be forwarded to a Packet Data Network Gateway/Serving Gateway (PGW/SGW), e.g., PGW/SGW 120.

Generating the requested content may include generating a plurality of content segments based on the device information, the information associated with the AGBR, and a content quality. Sending the requested content includes sending at least one of the plurality of content segments. Each the plurality of content segments may be associated with one or more bitrates.

Figure 3:
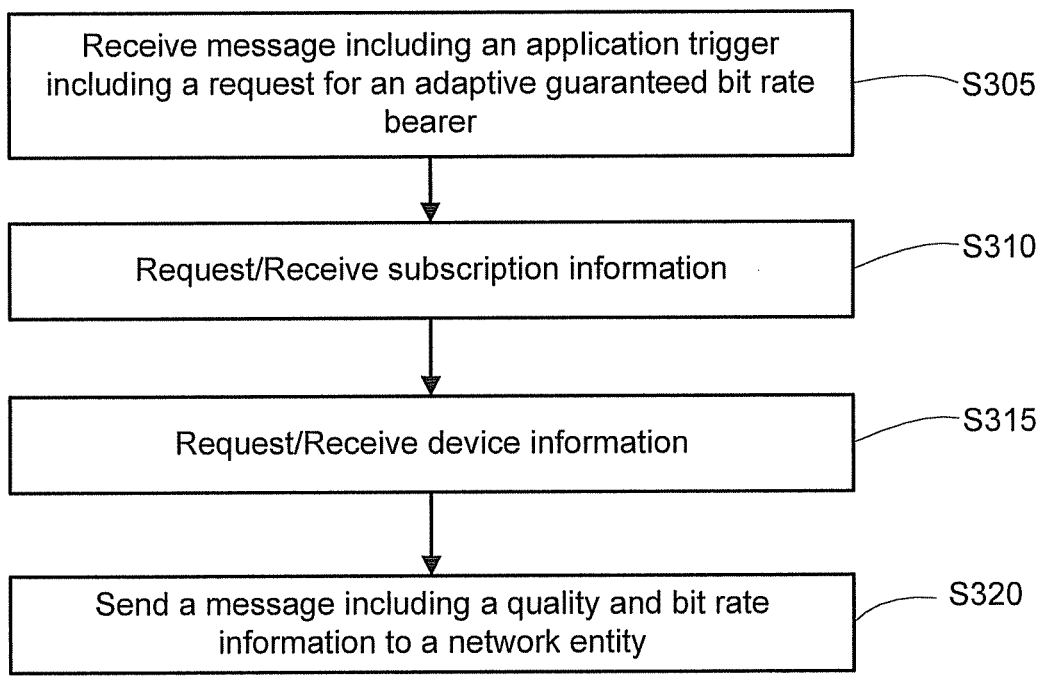
FIG. 3 illustrates another method for rate adaptive allocation of resources in accordance with at least one example embodiment.

FIG. 3 illustrates another method for rate adaptive allocation of resources in accordance with at least one example embodiment. Referring to FIG. 3, in step S305 a network entity may receive a message including an application trigger including a request for an adaptive guaranteed bit rate bearer. The network entity may be, for example, a server including a Policy Charging and Rules Function (PCRF), e.g., PCRF 125. The application trigger is discussed above and will not be discussed further for the sake of brevity.

In step S310 the network entity may receive/request subscription information. As discussed above, the application trigger may include subscription information. The device information may include the subscription information. Alternatively and/or in addition, the network entity may request the subscription information from, for example, a Home Subscription Server/Subscriber Profile Repository (HSS/SPR), e.g., HSS/SPR 130. The subscription information may include, for example, quality of service (QoS) class information. The quality of service (QoS) class information may include gold/silver/bronze level classifications. The quality of service (QoS) class information may include subscriber bitrate guarantees. Quality of service (QoS) classes are known to those skilled in the art and will not be discussed further for the sake of brevity.

In step S315 the network entity may receive/request device information. As discussed above, the application trigger may include device information. Alternatively and/or in addition, the network entity may request the device information from, for example, a Home Subscription Server/Subscriber Profile Repository (HSS/SPR), e.g., HSS/SPR 130. In addition to the device information discussed above, the device information may include known mobile equipment identities of, for example, one or more mobile units (e.g., mobile unit 110)

In step S320 the network entity may send a message including a quality and bitrate information to a network entity. The another network entity may be, for example, a Packet Data Network Gateway/Serving Gateway (PGW/SGW), e.g., PGW/SGW 120.

For example, 3GPP TS 23.203 V8.9.0 (2010-03) defines a QoS class identifier (QCI). 3GPP TS 23.203 V8.9.0 (2010-03) also defines a GBR bearer as an IP-CAN bearer with reserved (guaranteed) bitrate resources. According to 3GPP TS 23.203 V8.9.0 (2010-03) bearers and QCI are related according to Table 1 shown below.

TABLE 1

| QCI | Resource Type | Priority | Packet Delay Budget (ms) | Packet Error Loss Rate | Example Services |
| --- | --- | --- | --- | --- | --- |
| 1 | GBR | 2 | 100 | $10^{-2}$ | Conversational Voice |
| 2 |  | 4 | 150 | $10^{-3}$ | Conversational Video (Live Streaming) |
| 3 |  | 3 | 50 | $10^{-3}$ | Real Time Gaming |
| 4 |  | 5 | 300 | $10^{-6}$ | Non-Conversational Video (Buffered Streaming) |
| 5 | Non-GBR | 1 | 100 | $10^{-6}$ | IMS Signalling |
| 6 |  | 6 | 300 | $10^{-6}$ | Video (Buffered Streaming) TCP-based (e.g., www, e-mail, chat, ftp, p2p file sharing, progressive video, etc.) |
| 7 |  | 7 | 100 | $10^{-3}$ | Voice, Video (Live Streaming) Interactive Gaming |
| 8 |  | 8 | 300 | $10^{-6}$ | Video (Buffered Streaming) TCP-based (e.g., www, e-mail, chat, ftp, p2p filesharing, progressive video, etc.) |
| 9 |  | 9 |  |  |  |

As can be seen from Table 1, QCI values indicate specific quality settings associated with a bearer for delivering content. The message may include a QCI field indicating the quality information. As can be seen from Table 1 the resource type (e.g., type of bearer) includes GBR (QCI=1-4) and Non-GBR (QCI=5-9). Example embodiments include designating an Adaptive Guaranteed Bitrate (AGBR) bearer. The quality information may indicate the AGBR bearer. For example, the message may include a QCI value not listed in table 1. According to example embodiments, using a QCI value not listed in table 1 indicates an AGBR bearer. For example, the QCI value may be greater than 9.

For example, the standard supports QCIs>9, but the properties of bearers with those QCIs are undefined. A QCI=10 bearer may have similar properties to the QCI=4 bearer, which is a GBR bearer used for Non-Conversational Video (Buffered Streaming). HAS video bit rates may be conveyed by using additional QCI values and mapping them to bit rate sets commonly used for HAS videos.

According to example embodiments, QCI may also be used to indicate scheduling algorithms. For example, a QCI value of 10 may indicate a first scheduling algorithm, a QCI value of 11 may indicate a second scheduling algorithm, and so on. The scheduling algorithm may be used by a network device responsible for scheduling wireless transmissions (e.g., eNodeB 115).

As indicated above, the message sent in step S320 may also include bitrate information. The bit rate information may include the GBR. As is known, a GBR is a minimum bitrate guaranteed to a user of a device based on, for example, a QoS class. The GBR may also be communicated to the network entity in the received message. The bitrate information may also include a maximum bitrate (MBR). For example, a MBR may be based on the GBR (e.g., 2×GBR, or 1×GBR). Alternatively MBR may be based on a device (e.g., mobile unit 110) characteristic (e.g., screen size or download capability).

Figure 4:
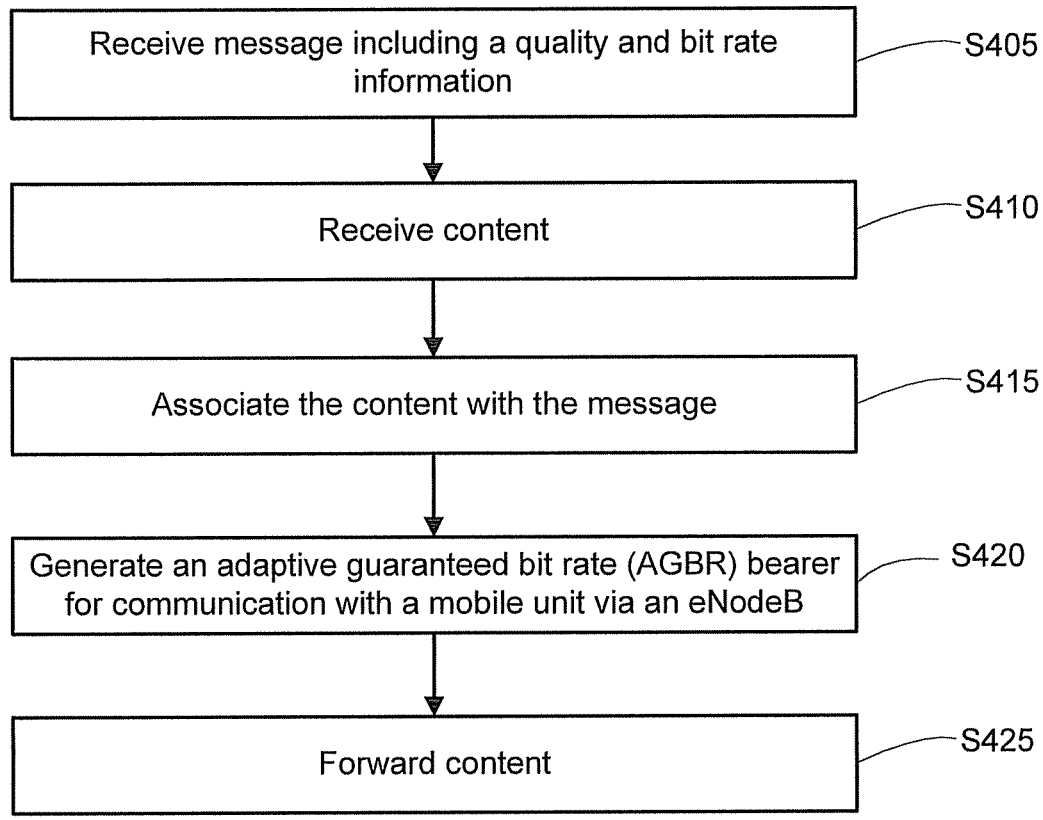
FIG. 4 illustrates another method for rate adaptive allocation of resources in accordance with at least one example embodiment.

FIG. 4 illustrates another method for rate adaptive allocation of resources in accordance with at least one example embodiment. Referring to FIG. 4, in step S405 a network entity may receive a message including a quality and bitrate information. The network entity may be, for example, a Packet Data Network Gateway/Serving Gateway (PGW/SGW), e.g., PGW/SGW 120. The network entity may receive the message from, for example, a server including a Policy Charging and Rules Function (PCRF), e.g., PCRF 125. The message may be the message sent in step S320 discussed above. Therefore, the message will not be discussed further for the sake of brevity.

In step S410 the network entity may receive content. The content may be the content sent in step S235 discussed above. Therefore, the content will not be discussed further for the sake of brevity. In step S415 the network entity may associate the content with the message. For example, the content and the message may be associated with a request for content, e.g., the request for content discussed above with regard to step S205. For example, the content and the message may include fields that have a same address or device ID.

In step S420 the network entity may generate an adaptive guaranteed bit rate (AGBR) bearer for communication with a mobile unit via another network entity. The another network entity may be a network device responsible for scheduling wireless transmissions (e.g., eNodeB 115).

The AGBR bearer may be generated by setting up a standard GBR bearer using known methods. The standard GBR bearer may be based on, for example, one of the GBR bearers shown above in Table 1. For example, the GBR bearer associated with a QCI value of 4. However, whereas the known GBR bearer has a fixed guarantee, the AGBR bearer according to example embodiments sets a target bitrate based on the guaranteed bitrate. Further, the AGBR bearer according to example embodiments may set a range for the bitrate as a floor (e.g., target) and a maximum (e.g., MBR discussed above). Setting a range for the bitrate may be advantageous in that allocating resources above that which the target device (e.g., mobile unit 110) can receive is a waste of resources that can be allocated elsewhere.

In step S425 the network entity may forward the content to the another device.

Figure 5:
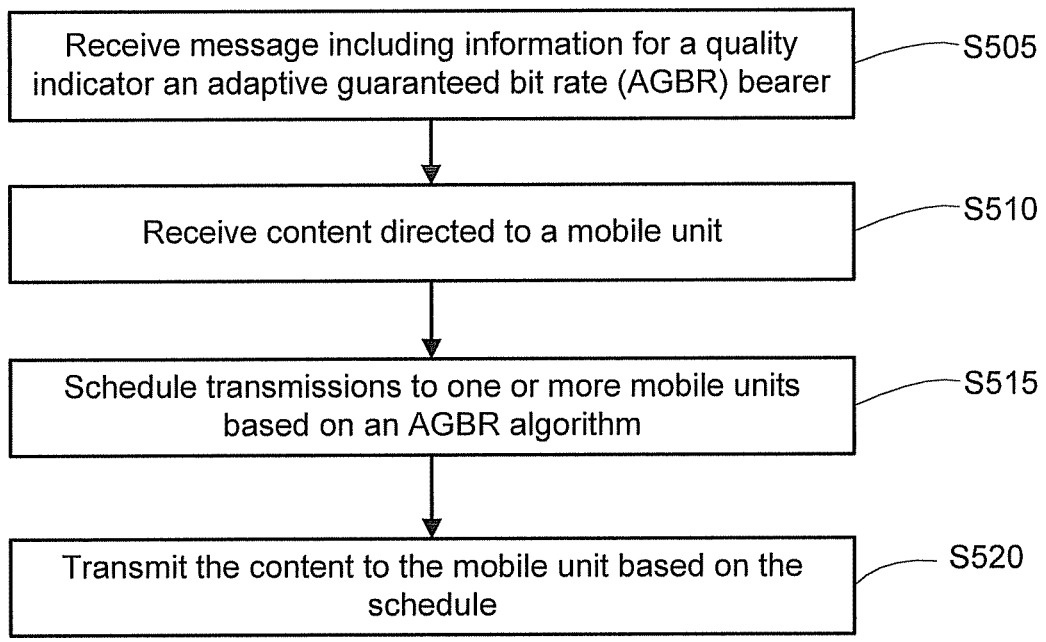
FIG. 5 illustrates another method for rate adaptive allocation of resources in accordance with at least one example embodiment.

FIG. 5 illustrates another method for rate adaptive allocation of resources in accordance with at least one example embodiment. Referring to FIG. 5, in step S505 a network entity may receive a message including information for a quality indicator and an adaptive guaranteed bit rate (AGBR) bearer. The quality indicator (e.g., QCI) and the AGBR bearer are described above. Therefore, for the sake of brevity, the quality indicator (e.g., QCI) and the AGBR bearer will not be described further.

In step S510 the network entity may receive content directed to a mobile unit. The content may be the content sent in step S235 and S425 discussed above. The mobile unit may be, for example, mobile unit 110. In step S515 the network entity may schedule transmissions to one or more mobile units based on an AGBR algorithm.

For example, a virtual scheduler may update rates such that a scheduling is being performed similar to a known proportional fair scheduler. The virtual scheduler determines AGBR values for the real scheduler which are periodically updated based on calculations (using the AGBR algorithm) in the virtual scheduler. Further details of the scheduler are described in co-pending application Ser. No. 13/253,368 the entire contents of which is hereby incorporated herein by reference.

In step S520 the network entity transmits the content to the mobile unit (e.g., mobile unit 110) based on the schedule. Transmitting data packets including content from a eNodeB to a mobile unit is known to those skilled in the art and will not be discussed further for the sake of brevity.

Although the above example embodiments describes the steps as being performed by the network entities illustrated in FIG. 1, example embodiments are not limited thereto. For example, the above steps (regarding the method steps of FIGS. 2-5) may be performed by alternative network components.

Alternative embodiments of the invention may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

We claim:

1. A method for serving content, the method comprising:
    receiving a first message from a mobile unit, the first message including a request for content and an indication to use an adaptive guaranteed bitrate (AGBR) bearer to transmit the content to the mobile unit;
    generating a second message based on the first message, the second message including at least device information associated with the mobile unit, an application identifier, a guaranteed bitrate (GBR) request indication and information associated with the AGBR, the application identifier triggering a subscriber lookup based on the GBR request indication, the device information and the information associated with the AGBR;
    generating the requested content such that the content is configured to be transmitted over the AGBR bearer;
    sending the requested content to a first network entity; and
    sending the second message to a second network entity.

2. The method of claim 1, wherein the first message includes at least one of information associated with an application and the device information associated with the mobile unit.

3. The method of claim 1, further comprising retrieving at least one of information associated with an application and the device information associated with the mobile unit from a network device.

4. The method of claim 3, wherein the first message includes at least one of an application identifier (ID) and a device ID used to determine at least one of the information associated with the application and the device information associated with the mobile unit.

5. The method of claim 1, further comprising:
    determining the AGBR bearer will be used to transmit the content to the mobile unit based on a Quality of Service (QoS) Class Identifier (QCI) associated with the first message, wherein
        the QCI is the indication to use the AGBR bearer, and
        a value of the QCI is undefined in a communications standard.

6. The method of claim 1, wherein
    generating the requested content includes generating a plurality of individually addressable content segments based on the device information, the information associated with the AGBR bearer, and a content quality, and
    sending the requested content includes sending at least one of the plurality of content segments.

7. The method of claim 6, wherein the second message includes a Universal Resource Locator (URL).

8. The method of claim 1, wherein
    the second message includes device dependent bitrate information, and
    the device dependent bitrate information is mapped to the information associated with the AGBR.

9. A method for indicating an adaptive guaranteed bitrate (AGBR) bearer, the method comprising:
    receiving, at a server, a first message from a content server, the first message including an application identifier and a guaranteed bitrate (GBR) request indication;
    retrieving, by the server, subscriber and device information based on the application identifier and the GBR request indication; and
    sending, by the server, a second message to a serving gateway, the second message including a Quality of Service (QoS) Class Identifier (QCI), the QCI indicating to use the AGBR bearer for delivering content to a mobile unit.

10. The method of claim 9, wherein
    the subscriber information includes a QoS class indicator, and
    a bitrate associated with the AGBR bearer is based on the QoS class indicator.

11. The method of claim 9, wherein
    the guaranteed bitrate (GBR) request indication includes a guaranteed bitrate, and
    a target bitrate associated with the AGBR bearer is based on the guaranteed bitrate.

12. The method of claim 9, wherein when a quality control indicator indicating the AGBR bearer is a QCI field in the second message, the QCI field is set to an undefined value.

13. The method of claim 9, wherein
    the subscriber information includes device information, and
    a bitrate associated with the AGBR bearer is based on the device information.

14. The method of claim 9, wherein the QCI further indicates an AGBR scheduling algorithm.

15. A network node for indicating an adaptive guaranteed bitrate (AGBR) bearer, the network node comprising:
    a server configured to,
        receive a first message from a content server, the first message including an application identifier and a guaranteed bitrate (GBR) request indication;
        retrieve subscriber and device information based on the application identifier and the GBR request indication; and
        send a second message to a serving gateway, the second message including a Quality of Service (QoS) Class Identifier (QCI), the QCI indicating to use the AGBR bearer for delivering content to a mobile unit.

16. The network node of claim 15, wherein
    the subscriber information includes a QoS class indicator, and
    a bitrate associated with the AGBR bearer is based on the QoS class indicator.

17. The network node of claim 15, wherein
    the guaranteed bitrate (GBR) request indication includes a guaranteed bitrate, and
    a target bitrate associated with the AGBR bearer is based on the guaranteed bitrate.

18. The network node of claim 15, wherein when a quality control indicator indicating the AGBR bearer is a QCI field in the second message, the QCI field is set to an undefined value.

19. The network node of claim 15, wherein
    the subscriber information includes device information, and
    a bitrate associated with the AGBR bearer is based on the device information.

20. The network node of claim 15, wherein the QCI further indicates an AGBR scheduling algorithm.

21. A method for generating an adaptive guaranteed bitrate (AGBR) bearer, the method comprising:
    receiving a first message from a first network entity, the first message including a Quality of Service (QoS) Class Identifier (QCI), the QCI indicating to use the AGBR bearer for delivering content to a mobile unit;
    generating the AGBR bearer based on the QCI and a default guaranteed bitrate (GBR) setting; and generating a second message based on the first message, the second message including at least device information associated with the mobile unit, an application identifier, a guaranteed bitrate (GBR) request indication and information associated with the generated AGBR, the application identifier triggering a subscriber lookup based on the GBR request indication, the device information and the information associated with the generated AGBR.

22. The method of claim 21, wherein
the QCI is the indication to use the AGBR bearer, and
a value of the QCI is undefined in a communications standard.

23. The method of claim 22, wherein the default GBR setting is a non-conversational streaming setting associated with the communications standard.

24. The method of claim 22, wherein
the first message includes a guaranteed bitrate, and
a target bitrate associated with the AGBR bearer is the guaranteed bitrate.

25. The method of claim 21, wherein the QCI further indicates an AGBR scheduling algorithm.

26. The method of claim 21, further comprising sending the second message to a second network entity, wherein the first network entity is configured to perform a policy charging and rules function, and
the second network entity is configured to communicate with the mobile unit over a wireless interface.

27. A method for delivering content, the method comprising:

receiving a first message from a mobile unit, the first message including a request for content;
generating a second message based on the first message, the second message including an application identifier and a guaranteed bitrate (GBR) request indication;
generating the requested content such that the content is configured to be transmitted over an adaptive guaranteed bitrate (AGBR) bearer;
sending the requested content to a first network entity;
sending the second message to a second network entity;
receiving the second message by the second network entity;
retrieving subscriber and device information based on the application identifier and the GBR request indication;
sending a third message to the first network entity, the third message including a Quality of Service (QoS) Class Identifier (QCI), the QCI indicating to use the AGBR bearer for delivering the content to the mobile unit;
generating the AGBR bearer based on the QCI and a GBR setting;
associating the content with the AGBR bearer;
sending a fourth message and the content to a fourth network entity, the fourth message including the QCI;
scheduling the mobile unit on the AGBR bearer based on the QCI; and
communicating the content to the mobile unit based on the schedule.

* * * * *